Dec. 17, 1957     H. C. HALL     2,816,496
STABILIZED CULTIVATOR ATTACHMENT FOR TRACTORS
Filed Sept. 28, 1955     2 Sheets-Sheet 1
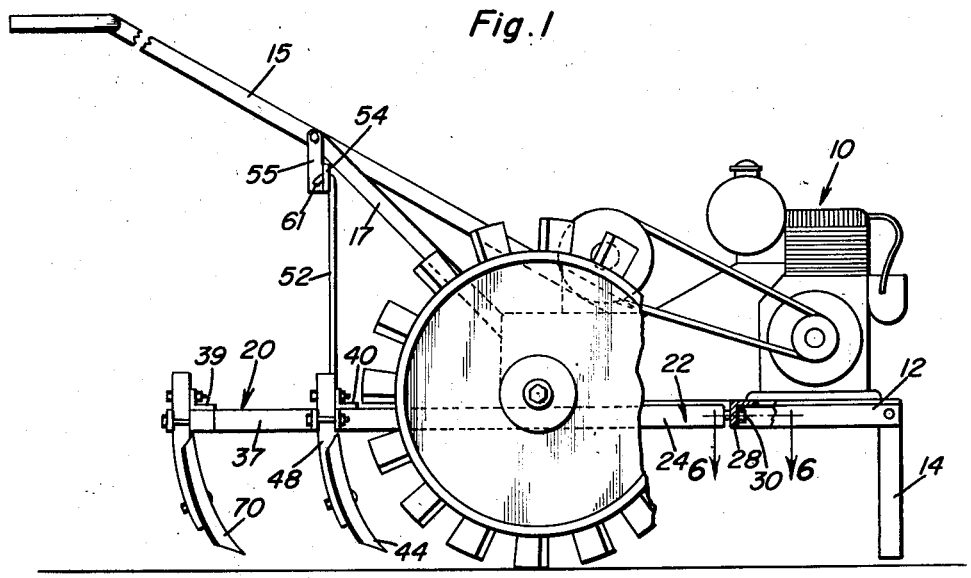
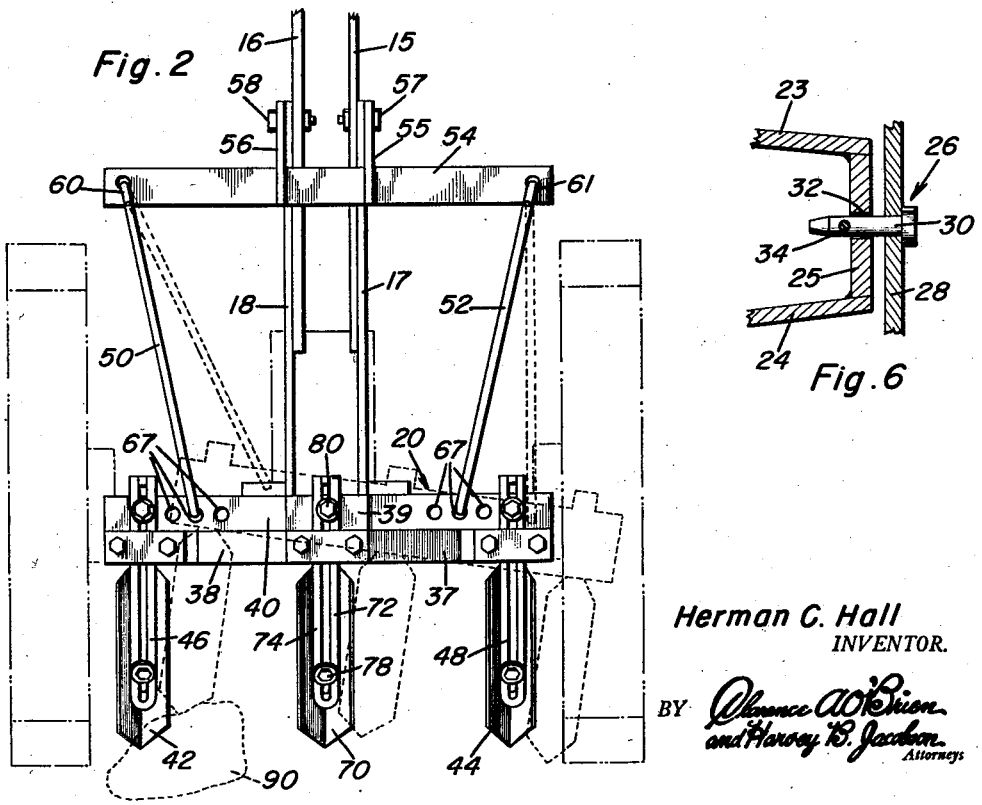
Herman C. Hall
INVENTOR.

Dec. 17, 1957  H. C. HALL  2,816,496
STABILIZED CULTIVATOR ATTACHMENT FOR TRACTORS
Filed Sept. 28, 1955  2 Sheets-Sheet 2
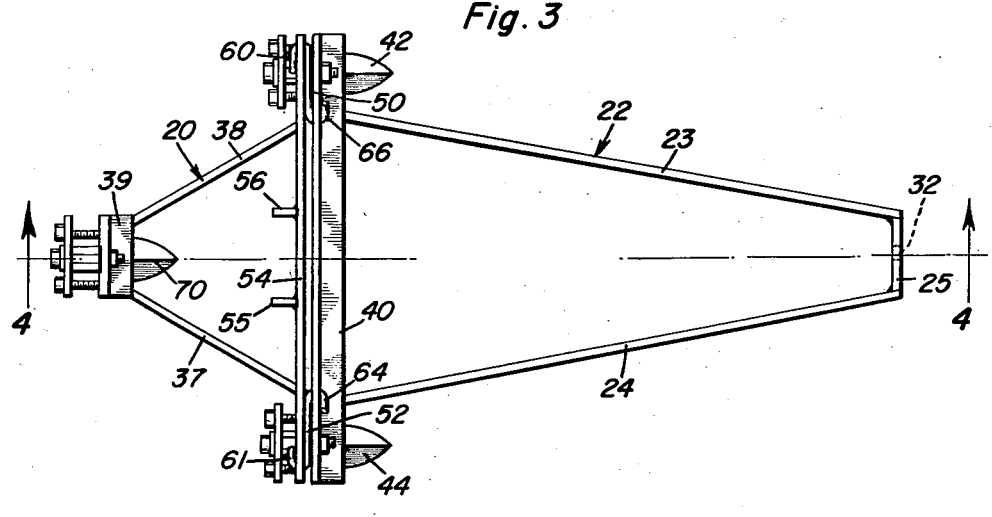
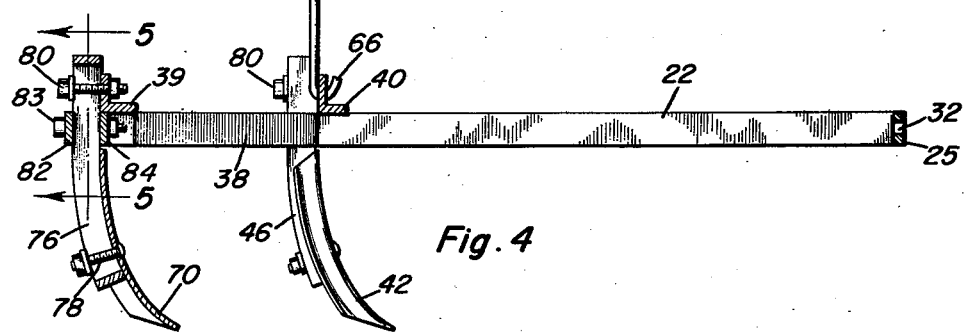
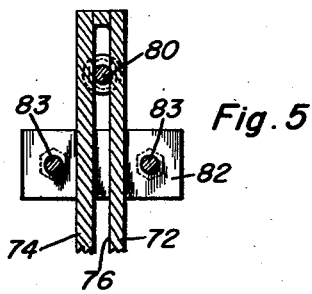
Herman C. Hall
INVENTOR.

United States Patent Office 2,816,496
Patented Dec. 17, 1957

2,816,496

STABILIZED CULTIVATOR ATTACHMENT FOR TRACTORS

Herman C. Hall, Bassett, Va.

Application September 28, 1955, Serial No. 537,258

8 Claims. (Cl. 97—47.52)

This invention relates to tractor attachments, and particularly to a cultivator adapted to be drawn by a tractor.

When plows are fastened to tractors and enough play is allowed whereby the plow is able to glide around obstructions, the plows are inclined to sway to the lower side while plowing on a hill slope. An object of this invention is to provide means for deriving the advantages of such play or lost motion when the cultivator strikes an obstruction and yet, maintain the cultivator in alignment with the pulling force of the tractor even when striking an obstacle, in which case the misalignment is merely momentary.

A more specific object of this invention is to provide a stabilized cultivator attachment for a tractor where there is a frame mounted for pivotal movement at the forward end thereof on the tractor drawbar or the equivalent so that the frame is capable of pivotal motion about a generally longitudinal axis, this frame being provided with a beam to which hangers are pivotally connected, the upper ends of these hangers being suspended and spaced from each other a distance different from the spacing of the lower ends of the hangers, whereby when one side of the frame is lifted, as by one of the cultivators striking a rock in the field, the frame is pivotally rotated about the generally longitudinal axis whereby the hanger on the opposite side of the frame is moved through an arc in such direction that the distance measured vertically between the upper end of the hanger and the frame is increased, thereby driving the cultivator on that side of the frame farther into the ground and increasing the resistance to forward pull of the frame. In this way, a moment measured about the longitudinal axis and tending to return the frame to the generally horizontal position is generated. In this way, the frame tends always to maintain a level position which trails the tractor. When operating on a slope, the same operational conditions prevail which tend always to keep the frame properly arranged behind the tractor for most effective plowing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a typical tractor to which the cultivator is secured;

Figure 2 is a back view of the attachment in Figure 1 with parts of the tractor shown in phantom and also showing parts of the attachment in a second position;

Figure 3 is a plan view of the attachment of Figure 1 with the tractor omitted;

Figure 4 is a longitudinal sectional view taken substantially on the line 4—4 of Figure 3 and in the direction of the arrows;

Figure 5 is an enlarged sectional view taken substantially on the line 5—5 of Figure 4 and in the direction of the arrows; and Figure 6 is an enlarged sectional view taken on the line 6—6 of Figure 1 and in the direction of the arrows.

A typical garden tractor 10 is illustrated in Figure 1, this tractor including an engine, chassis 12 and stand 14 at the forward end thereof. A pair of arms 15 and 16 supported at 17 and 18 have handles at their outer ends and are attached at their inner ends to the chassis 12. This is a typical, standard type garden tractor and illustrates but one of the many types of garden and farm tractors which may be used for drawing the attachment 20. The attachment 20 includes a frame 22 having sides 23 and 24 which are directed inwardly toward each other at their front ends where cross-member 25 is attached. A hitch 26 connects cross-member 25 to the tractor drawbar 28, this hitch allowing the frame to pivot about an axis which is generally horizontally and generally parallel to the draft force. A mechanically simple hitch 26 (Figure 6) comprises a spindle 30 passed through an aperture in the drawbar 28 and through aperture 32 in cross-member 25. A transverse pin or cotter key 34 is in the spindle 30 preventing the frame 22 from separating from the drawbar but yet allowing the frame to be pivoted about the axis of the spindle 30. Aperture 32 is slightly enlarged to assure that there is ample freedom in this motion.

Frame 22 also includes side members 37 and 38 which are connected to the ends of side members 23 and 24 and which converge toward rear cross-member 39, the latter being an angle which is welded or otherwise rigidly fixed to the converging ends of side members 37 and 38.

A transverse beam 40, preferably of angular cross-section, is welded or otherwise rigidly fixed to the sides. This beam is adapted to support cultivators, as plow shares 44 and 42 at their outer ends.

Each plow share is adjustably supported on a slotted hanger, there being slotted hanger 46 for plow share 42 and slotted hanger 48 for plow share 44 (Figure 2). A bolt and nut or other standard fastening device is used for attaching the plow shares to their hangers so that they may be adjusted with respect thereto. From Figure 3, it is observed that the cultivators are located at the outer ends of the beam 40 and are disposed on the outside of the frame 22.

A pair of hangers 50 and 52 respectively are attached to the transverse beam 40. Hangers 50 and 52 are suspended from the tractor by a bracket 54 having arms 55 and 56 projecting therefrom and secured, as by bolts 57 and 58, to the handles 15 and 16. Bracket 54 constitutes a fixed support in that it is movable with the tractor 10 rather than with the attachment frame 22. Apertures near the ends of the stationary support 54 have the eyes 60 and 61 at the upper end of hangers 50 and 52 mounted therein, these eyes being movable about pivot axes which are parallel to the pivot axis of the frame 22. The lower ends of the hangers 50 and 52 are fitted with eyes 64 and 66 accommodated in selected positions on the beam 40. The means for accomplishing this are the plurality of apertures 67 in the upstanding flange of the beam 40, these apertures affording a selection in which to accommodate the eyes 64 and 66. The lower ends of the hangers 50 and 52 are spaced a distance which differs from the spacing between the upper ends of the hangers. This is essential in order to obtain the mode of operation desired by the simplest structural organization.

The final cultivator comprises a plow share 70 which is attached directly to the frame 20 by a clamp, the same type of which is suggested for fastening the other plow shares 42 and 44 to the transverse beam 40. This clamp consists of two bars 72 and 74 respectively which are spaced from each other in order to provide a passageway 76 in which the bolt 78 is disposed. By moving the bolt 78 in the passageway 76 and tightening it in place, the plow share may be adjusted and locked in place. A bolt 80 is passed through the passageway 76 and is secured to the upstanding flange of the rear cross-member 39 of frame 22. Clamping plate 82 has bolt 83 passed through it, these bolts straddling bars 72 and 74 and passing through openings in the cross-member 84 constituting part of frame 22 and located immediately below the cross-member 39. By loosening the bolt 83, the two bars 72 and 74 may be moved vertically in unison inasmuch as they are attached together at the tops and bottoms thereof. In this way, further adjustment of the plow share 70 may be achieved.

In operaion, the tractor is power operated over the soil. Attachment 20 being drawn by the tractor drawbar follows the tractor, the cultivators working the soil. When an obstruction as at 90 (Figure 2) is met by one of the cultivators, frame 22 lifts upwardly pivotally rotating about a generally horizontal axis through the hitch 26. At the same time, hanger 50 swings inwardly toward that axis, and hanger 52 has its lower end swung outwardly away from the axis. However, the hanger 52 in swinging outwardly in an arc requires the side of the frame thereunder to move downwardly inasmuch as the effective vertical distance between the stationary support 54 and the beam 50 to which hanger 52 is attached, increases with the arcuate movement of hanger 52 in this direction. The result is that the cultivator 44 is moved deeper into the ground, offering greater resistance to forward movement of that side of frame 22 and further, generating a moment which operates about the general longitudinal axis mentioned previously, this moment tending to and actually returning very quickly the frame 22 to its general horizontal position. This stabilizing action maintains the plow shares level and stable during the cultivating operations.

Although one particular type of tractor is shown and the frame 22 is fitted with three cultivators in a particular arrangement, it is understood that variations that fall within the scope of the following claims may be made without departing from the invention.

What is claimed as new is as follows:

1. An attachment for a tractor of the type used by a walking attendant and which has a drawbar, said attachment comprising a frame, means securing the forward end of said frame to the tractor drawbar for pivotal movement about a generally horizontal axis, cultivators carried by said frame and on opposite sides of said axis, a fixed support disposed above said frame, and means on opposite sides of said axis and responsive to the lifting of one side of said frame for applying a force which depresses the opposite side of said frame so that the cultivator on that side of the frame is driven deeper thereby increasing resistance to forward motion of the frame and applying a moment to said frame directed to level the frame by rotative movement about said axis.

2. An attachment for a tractor of the type used by a walking attendant and which has a drawbar, said attachment comprising a frame, means securing the forward end of said frame to the tractor drawbar for pivotal movement about a generally horizontal axis, cultivators carried by said frame and on opposite sides of said axis, a fixed support disposed above said frame, and means on opposite sides of said axis and responsive to the lifting of one side of said frame for applying a force which depresses the opposite side of said frame so that the cultivator on that side of the frame is driven deeper thereby increasing resistance to forward motion of the frame and applying a moment to said frame directed to level the frame by rotative movement about said axis, the last mentioned means including a pair of hangers pivoted at their upper ends to said fixed support for movement about axes which are generally parallel and spaced from said horizontal axis.

3. An attachment for a tractor of the type used by a walking attendant and which has a drawbar, said attachment comprising a frame, means securing the forward end of said frame to the tractor drawbar for pivotal movement about a generally horizontal axis, cultivators carried by said frame and on opposite sides of said axis, a fixed support disposed above said frame, and means on opposite sides of said axis and responsive to the lifting of one side of said frame for applying a force which depresses the opposite side of said frame so that the cultivator on that side of the frame is driven deeper thereby increasing resistance to forward motion of the frame and applying a moment to said frame directed to level the frame by rotative movement about said axis, the last mentioned means including a pair of hangers pivoted at their upper ends to said fixed support for movement about axes which are generally parallel and spaced from said horizontal axis, said hangers being pivoted at their lower ends to said frame, said hangers being arranged at an angle with respect to each other so that pivotal motion of one in one direction causes pivotal movement of the other in the same direction but apportions differently the distance between said upper support and said frame.

4. An attachment for a tractor of the type used by a walking attendant and which has a a drawbar, said attachment comprising a frame, means securing the forward end of said frame to the tractor drawbar for pivotal movement about a generally horizontal axis, cultivators carried by said frame and on opposite sides of said axis, a fixed support disposed above said frame, and means on opposite sides of said axis and responsive to the lifting of one side of said frame for applying a force which depresses the opposite side of said frame so that the cultivator on that side of the frame is driven deeper thereby increasing resistance to forward motion of the frame and applying a moment to said frame directed to level the frame by rotative movement about said axis, the last mentioned means including a pair of hangers pivoted at their upper ends to said fixed support for movement about axes which are generally parallel and spaced from said horizontal axis, said hangers being pivoted at their lower ends to said frame, said hangers being arranged at an angle with respect to each other so that pivotal motion of one in one direction causes pivotal movement of the other in the same direction but apportions differently the distance between said upper support and said frame, and means on said frame on which said hangers are pivoted accommodating the ends of said hangers in selected positions in order to selectively adjust the angularity between said hangers.

5. The attachment of claim 4 wherein said hanger accommodating means comprises a transverse beam on the ends of which two of said cultivators are mounted, and said beam having a plurality of apertures in which to selectively accommodate said hangers.

6. The attachment of claim 4 wherein said hanger accommodating means comprises a transverse beam on the ends of which two of said cultivators are mounted, said beam having a plurality of apertures in which to selectively accommodate said hangers, and another of said cultivators being carried by said frame behind said transverse beam and located on said longitudinal axis and between the cultivators on said beam.

7. An attachment for a tractor which has a pair of wheels and a drawbar, said attachment comprising a frame having a forward end cross-member, a hitch connecting said cross-member to the tractor drawbar in advance of said wheels for pivotal movement about a generally horizontal axis, a transverse beam secured to said frame rearwardly of said hitch, cultivators on said beam at the outer ends thereof and on the outer sides of said frame, a trailing cultivator on said frame located between the first mentioned cultivators and rearwardly thereof, a relatively stationary support located above said transverse beam, and means connected to said support and said transverse beam responsive to the lifting of one side of said frame for depressing the opposite side of said frame so that the cultivator thereunder is moved farther into the soil whereby the resistance to forward movement of that cultivator through the soil is increased in order to apply force tending to return said frame.

8. A cultivator comprising a frame, means for attaching the forward end of said frame to a tractor drawbar for pivotal movement about a generally horizontal axis, a beam secured to said frame transversely of said axis, cultivators on said beam and laterally spaced from said axis, a stationary support located above said beam, hangers pivoted at their upper ends to said support, said hangers being pivoted at their lower ends to said beam, the spacing between the upper ends of said hangers being different from the spacing between the lower ends of said hangers so that lifting movement on one side of said beam applies forces to said hangers which pivotally actuate the lower end of one of said hangers toward said axis and which pivotally actuate the lower end of the other of said hangers away from said axis, thereby depressing the opposite side of said beam and frame and driving the cultivator thereon deeper into the soil, whereby an increased resistance to forward motion of the frame is obtained on one side of the frame tending to stabilize and return the frame pivotally about said axis.

References Cited in the file of this patent

UNITED STATES PATENTS

| | | |
|---|---|---|
| 1,176,020 | Bangert | Mar. 21, 1916 |
| 1,288,805 | Beeman | Dec. 24, 1918 |
| 1,472,136 | Quinby | Oct. 30, 1923 |
| 2,354,886 | Silver | Aug. 1, 1944 |
| 2,420,530 | Evans | May 13, 1947 |
| 2,743,656 | Fraga | May 1, 1956 |